United States Patent [19]
Garner et al.

[11] Patent Number: 5,557,456
[45] Date of Patent: Sep. 17, 1996

[54] PERSONAL INTERFACE DEVICE FOR POSITIONING OF A MICROSCOPE STAGE

[75] Inventors: David M. Garner; Chun M. Louie, both of Vancouver; Daniel B. Harrison, Burnaby; Donald J. Dale, Richmond, all of Canada

[73] Assignee: Oncometrics Imaging Corp., Vancouver, Canada

[21] Appl. No.: 206,735

[22] Filed: Mar. 4, 1994

[51] Int. Cl.[6] .......................... G02B 21/26; G02B 21/00
[52] U.S. Cl. .......................... 359/393; 359/383; 359/392
[58] Field of Search .................... 359/391–394, 359/368, 383; 356/139, 401, 394–396, 44

[56] References Cited

U.S. PATENT DOCUMENTS

| | | | |
|---|---|---|---|
| 4,012,112 | 3/1977 | Masterson | 359/393 |
| 4,414,749 | 11/1983 | Johannsmeier | 359/385 |
| 4,445,758 | 5/1984 | Emmel | 359/392 |
| 4,711,537 | 12/1987 | Schindl et al. | 359/393 |
| 4,810,869 | 3/1989 | Yabe et al. | 250/201.3 |
| 4,930,882 | 6/1990 | Koch et al. | 359/392 |

FOREIGN PATENT DOCUMENTS

| | | |
|---|---|---|
| 2623299 | 11/1987 | France . |
| 401239407 | 9/1989 | Japan . |
| 2145544 | 3/1985 | United Kingdom . |

*Primary Examiner*—Thong Nguyen
*Attorney, Agent, or Firm*—Christensen, O'Connor, Johnson & Kindness PLLC

[57] ABSTRACT

Apparatus for manually controlling a motorized microscope stage for movement about the X, Y and Z axes. The apparatus includes a main housing having an X axis control knob and a Y axis control knob rotatably mounted to the housing. A Z axis control knob is provided for controlling movement about the Z axis. The Z axis knob is mounted to a removable module so that the position of the Z axis control knob is adjustable with respect to the other knobs. There is a controller for generating stage control signals in response to movement of the knobs. A plug-in connector connects the apparatus to the microscope stage controller such that the stage control signals create corresponding movements of the motorized stage. The apparatus simulates the controls of a nonmotorized stage while maintaining compatibility with existing stage controller units. The apparatus is designed to provide tactile position feedback to the user similar to that of a manual non-motorized microscope.

9 Claims, 2 Drawing Sheets

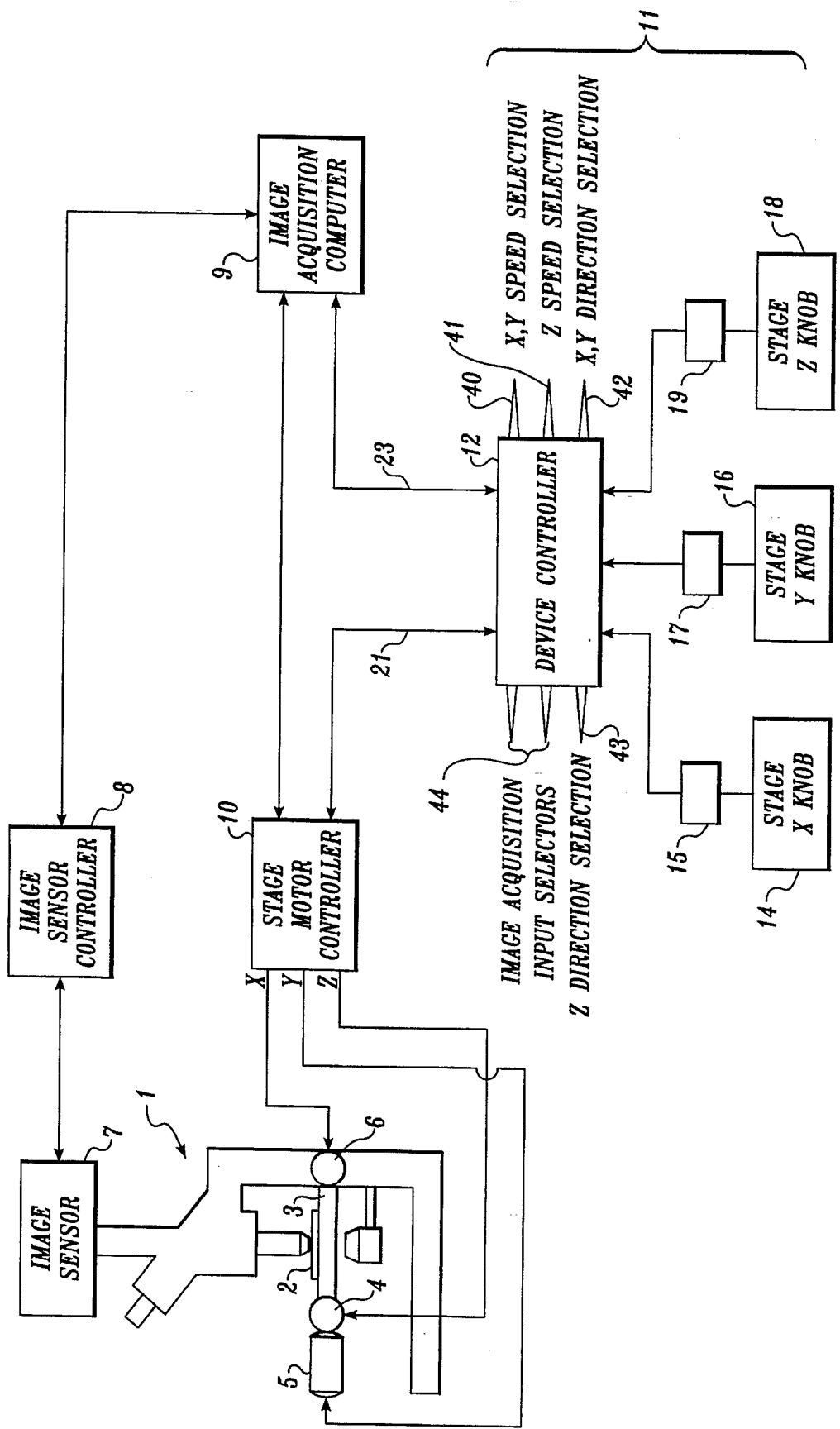

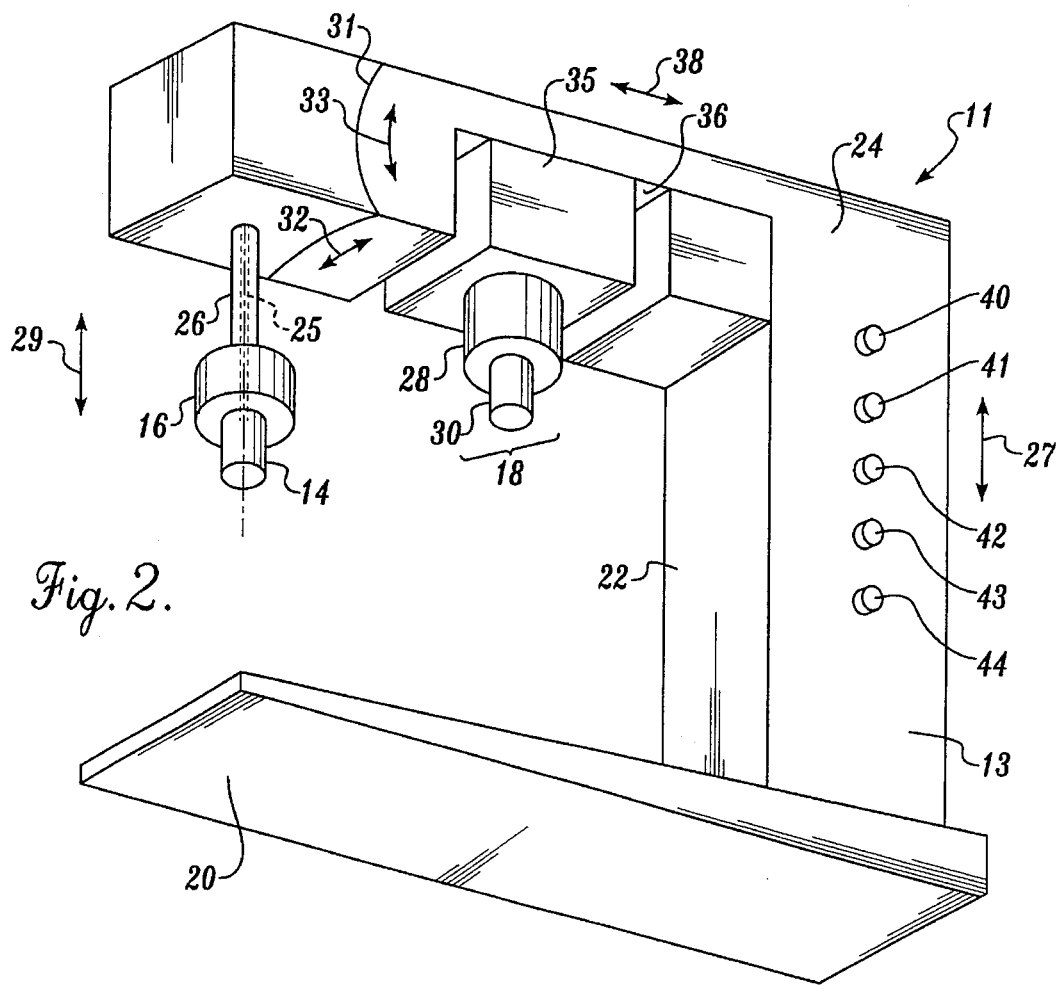
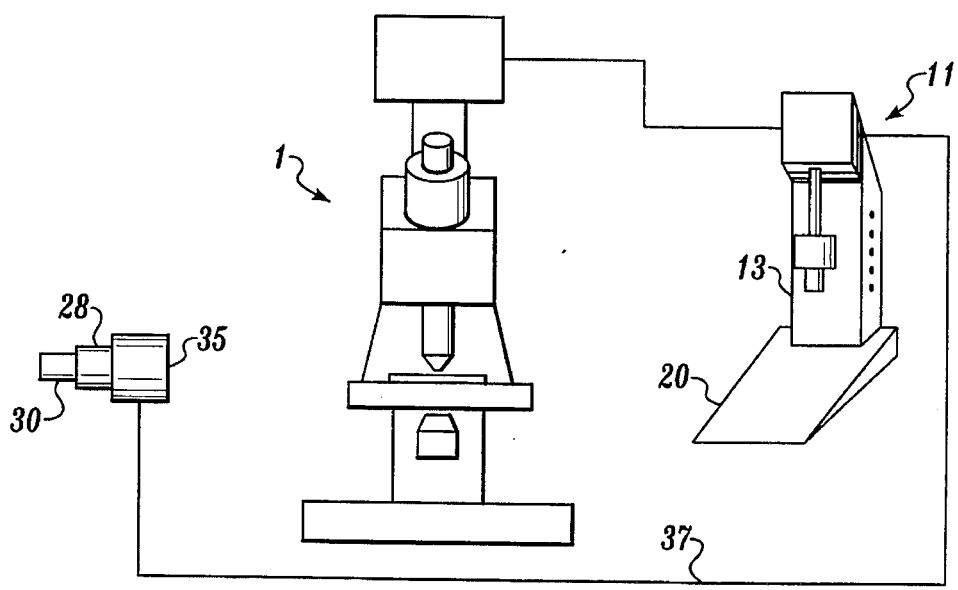

PERSONAL INTERFACE DEVICE FOR POSITIONING OF A MICROSCOPE STAGE

FIELD OF THE INVENTION

This invention relates to a controller for positioning a motorized stage of a microscope.

BACKGROUND OF THE INVENTION

The basic manual microscope in which an observer examines a specimen through ocular lenses has been available for centuries and is still very much in use. Increasingly, however, automation has been applied to the basic optical microscope and the scanning of slides can now be computer controlled. A typical computer controlled system consists of a microscope, an image sensor (often a video camera) and an image processing computer capable of quantitative measurements of the image, a 3-axis motorized stage, and a stage controller which accepts commands from the computer to move the stage in the X, Y, and Z directions.

Despite this high level of microscope automation, interactive operation, in which the user, rather than the computer manipulates the microscope stage to scan and focus, remains a necessity. It is at times desirable for an operator to use the microscope in "real microscope mode" which is the traditional manner of looking directly through the ocular lens at the image being scanned and focused. It is also sometimes desirable for the operator to use the microscope in "virtual microscope mode" in which the image is collected by the image sensor (e.g. a video camera) and projected on an image display (e.g. TV monitor) and the operator manipulates the stage for image acquisition and analysis.

Presently, when a microscope system is not used in fully automatic computer controlled mode, it can be switched to an interactive stage mode where the stage movement is controlled via a joystick manipulated by the operator. Stage movement in the ±X direction is controlled by moving the joystick left and right, movement in the ±Y direction is controlled by moving the joystick forward and backward, and movement in the ±Z axis direction (for focusing) is achieved by rotating the joystick knob. The speed of stage movement in the X and Y directions is usually proportional to the joystick displacement while the speed of movement in the Z direction is proportional to angular rotation. The joystick is spring-loaded to return to a central null position when released.

There are recognized problems with interactive manipulation of the stage. Cytotechnologists and pathologists who are experienced in the operation of traditional microscopes without motorized stages find the joystick very difficult to use. Scanning a slide involves two simultaneous controlled operations: translation of the slide in the X or Y directions and fine focus adjustment in the Z direction. With a joystick, this involves the simultaneous twisting and rocking of the device with one hand. This cannot be done in a controlled fashion partly because of the complex, non-intuitive nature of the physical movement, and partly because of the speed problem described next. The speed of the stage movement is directly proportional to the amount of joystick displacement, while the amount of stage displacement becomes a function of the speed of joystick displacement and time. This is not intuitive. In addition, regardless of the motor speeds and acceleration ramps, the stage movement tends to be frustratingly slow, or too fast, resulting in overshooting the desired goal. A further problem is that any attempt to move one axis only with a joystick is very difficult because it is a "three in one" control device. Finally, the presence of a mirror in the light path to the ocular reverses the apparent sense of the stage movement: movement of the joystick to the left makes the specimen in the ocular appear to move to the right, and vice versa.

Despite these drawbacks, joysticks do offer the advantages of being ambidextrous, they allow "remote" operation appropriate for "virtual microscope mode", they can be operated with one hand (albeit with difficulty in the usual embodiments) and they may be placed wherever the operator desires and the motors do most of the work.

Unmotorized stages share some problems with the joystick, namely the unmotorized stage has the same apparent direction reversal problem and the effective range of stage sensitivities (i.e. coarse versus fine control ranges) available to both unmotorized stage and joystick, is limited, particularly in X and Y. This is often most noticeable at very low or very high magnification.

SUMMARY OF THE INVENTION

The present invention provides an interface apparatus for interactive control of a motorized microscope stage for movement about X, Y and Z axes which is easy to use and overcomes the problems of the prior art joysticks and unmotorized stages referred to above.

It is an object of the present invention to provide an apparatus which allows simultaneous focus control as well as X and Y direction control through simple physical movements, with one or two hands.

It is a further object of the present invention to provide an apparatus that can adjustably accommodate left or right handed operators. The apparatus is provided with a set of controls that can be positioned and oriented to adjust the apparatus for maximum operator comfort rather than the operator having to adjust to accommodate the apparatus.

It is a further object of this invention to provide an apparatus to enable an operator to control a precision motorized stage which allows for "virtual microscope" remote control.

It is a further object of this invention to provide an apparatus in which speed and displacement of the motorized stage bears a direct relation to the angular speed and angular displacement, respectively, of control knobs, and in which operator definable sensitivity range selection for all three axis (often referred to as "coarse" and "fine" control) is available.

It is a further object of the present invention to provide an apparatus that has an additional optional operating mode in which speed of movement and displacement of the motorized stage is proportional only to the angular speed of the control knobs such that a quick rotation of a control knob results in a large movement of the stage and a slower rotation of control knob results in a smaller movement of the stage.

Accordingly, the present invention provides an apparatus for interactive manual control of a motorized microscope stage for movement about X, Y and Z axes comprising:

a main housing;

X, Y and Z axis control knobs actuatably mounted to the housing, the position of at least one of the control knobs being adjustable relative to the other control knobs;

means for generating stage control signals in response to actuation of the control knobs; and means for connecting the apparatus to communicate the stage control signals to the motorized stage.

The apparatus permits control of a precision motorized microscope stage with at least one separate control knob for each axis: X, Y and Z. Each axis is completely decoupled from the other two thereby eliminating unwanted accidental stage movement. The control knobs are mounted on a housing separate from the motorized stage in an arrangement described below.

Switchable direction controls are provided to allow the user to define clockwise knob rotation as positive or negative stage translation and thereby eliminate the apparent direction reversal due to the presence of a mirror in the ocular light path and allow the user to customize the control device to best suit their needs.

The present invention also allows input to the image control and acquisition computer via one or more switches or rotary knobs, thereby making some of the input functions that would otherwise be entered via a computer keyboard or mouse available on the stage personal interface device. dr

BRIEF DESCRIPTION OF THE DRAWINGS

Aspects of the present invention are illustrated, merely by way of example in the accompanying drawings, in which:

FIG. 1 is a schematic view of the apparatus of the present invention associated with an automated microscope and imaging system;

FIG. 2 is a perspective view of a preferred embodiment of the invention with a removable unit attached to the main housing for one-handed use, for example, in "virtual microscope mode";

FIG. 3 is a view of the preferred embodiment with the removable Z axis control unit separated from the main unit, for two-handed operation, for example, in "real" microscope mode.

DETAILED DESCRIPTION OF THE PREFERRED EMBODIMENT

Referring to FIG. 1, there is shown a schematic view of a typical automated system to which the apparatus of the present invention is connected. The automated microscope system comprises a microscope 1 to examine a sample 2 on a motorized stage 3 driven by X axis motor 4, Y axis motor 5 and Z axis motor 6. The microscope is fitted with an image sensor 7 associated with an image sensor controller 8 and an image acquisition computer 9. Image acquisition computer 9 can control motorized stage 3 via stage motor controller 10.

The personal interface device 11 of the present invention is connected between stage motor controller 10 and image acquisition computer 9. When an operator selects interactive control of stage 3, device 11 communicates with the stage motor controller 10 to control movement of the stage. Device 11 includes a controller 12 that interprets rotation of control knobs by the user and sends appropriate control signals to the stage motor controller 10 and/or image acquisition computer 9.

Stage movement commands are input to device controller 12 by various control knobs. In the illustrated embodiment, the control knobs are actuated by rotating them, however, other actuating control knobs such a sliding switches or the like are possible. In the preferred embodiment, each control knob is mounted to its own rotatable shaft and an associated rotary digital encoder (shaft encoder) is provided to track rotary movement of the knob. An X axis control knob 14 and associated encoder 15, a Y axis control knob 16 and associated encoder 17 and a Z axis control knob 18 for controlling focusing and associated encoder 19 are provided. Z axis control knob is mounted to a removable unit 35 that can be detached from device 11. Shaft encoders 15, 17 and 19 deliver signals to controller 12 with respect to the angular position of the associated control knob. The stage control signals created by controller 12 in response to movement of X axis knob 14, Y axis knob 16 and Z axis (focus) knob 18 drive corresponding movements of the motorized stage 3.

In the preferred embodiment, device controller 12 has a register for each control knob axis and maintains the digital position goal for each axis. The contents of each axis register are transmitted to stage motor controller 10 via control line 21 periodically and stage motor controller 10 causes the motors to step to the indicated position. Device controller 12 periodically reads the encoders and increments or decrements the corresponding axis position register appropriately. Fine control switches are provided for each axis and cause controller 12 to modify the output of an encoder by a programmable amount thereby varying the rate of change in the corresponding axis register. For example, fine control switches include button 40 on arm 22 which is used to toggle between a number of pre-selected stage movement speed ranges or sensitivities in the X and Y directions for a given knob rotation. Button 41 is used to control stage speed range or sensitivity in the Z direction. Button 40 or 41 act to adjust the value by which controller 12 modifies the output of an encoder in order to vary the rate of change of the corresponding axis register.

If desired, programmable switches can be provided that permit controller 12 to be programmed to move stage 3 such that speed of movement and displacement of the motorized stage is proportional to the angular speed or rate of rotation the control knobs. Under this control scheme, a quick rotation of a control knob results in a large movement of the stage and a slower rotation of a control knob results in a smaller movement of the stage. In such an arrangement, controller 12 changes the axis position registers in proportion to the number of signals per interval of time received from the encoders.

The apparatus also includes buttons 42 and 43 for switching the direction in which the motorized stage will move in response to rotation of a control knob in a particular direction. This allows the operator to define a clockwise knob rotation as positive or negative stage translation, for example, in order to eliminate the apparent stage direction reversal that occurs in a microscope due to the presence of a mirror in the ocular path or for other reasons. Button 42 is used to control movement direction about the X and Y axis and button 43 is used to control movement direction about the Z axis.

The apparatus of the present invention can also include means for inputting control commands to the image acquisition computer via control line 23. Normally, such commands would be entered via a computer keyboard or mouse. In the embodiment illustrated in FIG. 2, button 44 is used to issue the command for storing an image so that the user does not have to remove his hands from the apparatus. Other input functions for the image acquisition computer can be made available on the main housing of the present invention by appropriate programming of an available button or switch.

In an alternative control system, device controller 12 comprises a microprocessor that is used to control the apparatus of the present invention. In such an arrangement, the apparatus of the present invention is provided with an industry standard UART (Universal Asynchronous Receiver Transmitter) chip in controller 12 which sends and receives control signals to stage motor controller 10 and the data acquisition computer 9 as a serial stream of character encoded data.

In order to make the apparatus of the present invention compatible with existing joystick controlled microscopes, an additional alternative electronic control system is provided. In this alternative arrangement, device controller 12 is designed to convert the signals from the encoders to analog voltages. A knob rotation is translated by controller 12 into an analog voltage identical to the output of a joystick. With this method, the apparatus of the present invention can directly replace the joystick and be compatible with the existing stage controllers 10 by means of a plug connector. Each control knob is connected to a rotary encoder which outputs a number of digital signals. These signals are counted and the value fed to a digital to analog converter which outputs an analog voltage proportional to the amount of knob rotation. To simulate the return of the joystick to a null position when released, the counter is reset periodically to bring the output voltage to null and stop stage movement. This periodic reset also provides proportional control. If a knob is turned quickly, a large number of pulses will be counted during a period, resulting in a higher output voltage and hence a higher stage speed. If a knob is turned slowly, fewer pulses will be counted during a period, resulting in a lower output voltage and a slower stage speed.

There are numerous other electronic control systems possible for converting the rotary motion of the control knobs into appropriate motion of the microscope stage that will be apparent to person skilled in the art. While the internal control electronics of the present invention can be selected from among the arrangements described above or alternative designs, there follows a description of the preferred external arrangement of the present invention as illustrated in FIGS. 2 and 3.

Device 11 comprises a main housing 13 with a controller 12 for generating stage control signals. Main housing 13 comprises a heavy non-slip base 20 having a substantially vertical upstanding arm 22 and a substantially horizontal arm 24 extending from the vertical arm. Horizontal arm 24 supports Z axis knob 18 intermediate its length and the X and Y axis control knobs 14 and 16 at its distal end.

X axis control knob 14 and Y axis control knob 16 are co-axially mounted for rotation on concentric shafts 25 and 26. Shaft 25 is positioned within the interior of hollow shaft 26 to provide a compact arrangement. Y axis control knob 16 is mounted above the X axis control knob and is of slightly larger diameter and with a different texture. This arrangement permits the operator to determine the knob that is being manipulated simply by feel. The two co-axial knobs are mounted for independent movement.

A Z axis control knob is mounted to the underside of horizontal arm 24 for controlling focusing. Preferably, the Z axis control knob comprises two co-axial knobs 28 and 30 of different sizes mounted on a common axis. The Z axis control knob includes a coarse Z axis control knob 28 for controlling relatively large focusing movements and a fine Z axis control knob 30 for controlling relatively small focusing movements.

Various adjustments of the main housing unit are possible to customize the device to a particular user. Upstanding arm 22 may be telescoped by means of a conventional telescoping arrangement to permit raising or lowering of the control knobs with respect to base 20 as indicated by arrow 27. Both concentric shafts 25 and 26 telescope to permit vertical adjustment of the X and Y control knobs relative to the two axis knobs 30 as indicated by arrow 29. In addition, shaft 26 is connected to a shoulder joint 31 at the end of horizontal arm 24 to permit pivotable adjustment of the X and Y axis control knobs as indicated by arrows 32 and 33. Joint 31 is a ball and socket joint that can be locked into a preselected position.

The position of the Z axis control knob is also movable with respect to the main housing. Z axis control knobs 28 and 30 are mounted to a removable unit 35 that is detachable from a cavity 36 within main housing 13. Removable unit 35 is connected to housing 13 by a cable 37 so that the unit can still communicate with the device controller 12 when detached. As shown in FIG. 3, removable unit 35 and housing 13 can be positioned on either side of a microscope 1 so that the user can operate the X and Y control knobs with one hand and the Z control knobs on the removable unit with the other. The configuration illustrated in FIG. 3 is for right-handed users.

The position of the removable unit can also be adjusted laterally within the housing cavity 36 as shown by arrow 38 to permit positioning of the Z control knobs as desired by the user.

When removable unit 35 is positioned in cavity 36, the adjustability of the device allows a user to comfortably operate the X, Y and Z axis control knobs with one hand, and a computer keyboard or a mouse with the other.

Although the present invention has been described in some detail by way of example for purposes of clarity and understanding, it will be apparent that certain changes and modifications may be practised within the scope of the appended claims.

We claim:

1. Apparatus for interactive manual control of a motorized microscope stage for movement about X, Y and Z axes comprising:

a main housing;

an X and a Y axis control knob actuatably mounted to the housing and a rotary encoder coupled to each of the X and Y axis control knobs, the rotary encoders generating signals in response to the actuation of the X and Y axis control knobs;

a Z axis control unit that is removably secured to the main housing, the Z axis control unit including a Z axis control knob and a rotary encoder coupled to the Z axis control knob that generates signals in response to actuation of the Z axis control knob;

means for communicating the signals generated by the rotary encoder coupled to the Z axis control knob to the main housing when the Z axis control unit is removed from the main housing;

a controller for receiving the Signals produced by the rotary encoders, coupled to the X, Y and Z axis control knobs, the controller producing stage control signals to the motorized microscope stage; and means for connecting the stage control signals produced by the controller to the motorized microscope stage.

2. Apparatus as claimed in claim 1, in which the X and Y axis control knobs are mounted to the main housing for rotatable movement, the control knobs being actuated by being rotated.

3. Apparatus as claimed in claim 2, in which the X and Y axis control knobs are mounted to the housing co-axially.

4. Apparatus as claimed in claim 3, in which X and Y axis control knobs are mounted on co-axial shafts extending along a first axis for rotation of each control knob independent of the other control knob.

5. Apparatus as claimed in claim 1, wherein the Z axis control unit is securable within a cavity on the main housing and wherein the Z axis control unit is adjustable within the cavity of the main housing to permit selective positioning of the Z axis control knob.

6. Apparatus as claimed in claim 1, further comprising a ball and socket joint disposed on the main housing to which the X and Y axis control knobs are mounted.

7. Apparatus as claimed in claim 1, in which the Z axis control knob includes a coarse Z axis control knob for generating stage control signals that result in relatively large movements of the motorized stage along the Z axis and a fine Z axis control knob for generating stage control signals that result in relatively small movements along the Z axis.

8. Apparatus as claimed in claim 7, in which both Z axis knobs are rotatably mounted to the main housing in a co-axial configuration.

9. Apparatus as claimed in claim 1, including sensitivity control means to adjust the stage control signals generated by moving a particular control knob a given amount for varying the displacement of the motorized stage for a given movement of a control knob.

* * * * *